Patented Aug. 16, 1932

1,872,455

UNITED STATES PATENT OFFICE

GUSTAVE A. HORTON, OF ST. PAUL, MINNESOTA, ASSIGNOR OF ONE-HALF TO ANNE G. SWYGART, OF ST. PAUL, MINNESOTA

COMBINED FILLER AND PRIMER AND METHOD OF MAKING THE SAME

No Drawing.   Application filed April 5, 1930.   Serial No. 442,041.

It is the object of this invention to provide a combination filler and primer adapted to be applied to materials of various kinds and of such composition as to efficiently cover, and adhere with unusual tenacity, to the surfaces.

My improved composition may be applied to surfaces of metal, wood, plaster, concrete, stone, wall board, and other materials and, where applied to flexible materials, has the property of adhering thereto and efficiently covering the surface even when bent. It is unnecessary, after my composition has been applied to a surface, to apply more than a single coat of paint.

My improved composition preferably contains the following named constituents in the proportions indicated:

| | Quantity per gallon | Percentage by weight |
|---|---|---|
| | | Per cent |
| Dry white lead | 1½ lbs. | 13.56 |
| White lead in oil | 2½ lbs. | 22.60 |
| Boiled linseed oil | 1½ lbs. | 13.56 |
| Turpentine | 1½ lbs. | 13.56 |
| Japan drier | 1 lb. | 9.04 |
| Glue (fish or equivalent) | ½ lb. | 4.52 |
| Molasses | ½ lb. | 4.52 |
| Flour (wheat or equivalent) | ½ lb. | 4.52 |
| Water | ½ lb. | 4.52 |
| Pumice stone | ½ lb. | 4.52 |
| Vinegar (or equivalent acid) | ½ lb. | 4.52 |
| Alum | 2 oz. | 1.12 |

Where fish-glue or other suitable glue in dry form is employed, about eight ounces of such glue is first dissolved in a pint of water for each gallon of product and the dry white lead is preferably heated before mixing with the other constituents. All of the ingredients in the proportions above indicated are thoroughly mixed together and then heated and boiled for about one hour while stirring. This produces a uniform, stable composition which, when cool, is ready for use. For certain classes of work the turpentine and/or pumice stone and/or flour may be omitted. This composition has the peculiar property of adhering even where lime is present in the surface to be covered.

Having described my invention what I claim as new and desire to protect by Letters Patent is:

1. A boiled composition for use as a filler and primer comprising a vegetable drying oil and pigment base and a dryer, glue, molasses, vinegar and alum, turpentine, and wheat flour.

2. A boiled filler and primer containing the following named constituents in about the proportions indicated, by weight:

| | Per cent |
|---|---|
| Dry white lead | 13.56 |
| White lead in oil | 22.60 |
| Boiled linseed oil | 13.56 |
| Turpentine | 13.56 |
| Japan dryer | 9.04 |
| Glue | 4.52 |
| Molasses | 4.52 |
| Flour | 4.52 |
| Water | 4.52 |
| Pumice stone | 4.52 |
| Vinegar | 4.52 |
| Alum | 1.12 |

3. A combination filler and primer formed by thoroughly mixing and boiling together the following named ingredients: white lead, boiled linseed oil, turpentine, Japan dryer, molasses, water, vinegar, flour, pumice stone, glue and alum.

4. A combination filler and primer formed by thoroughly mixing and boiling together the following named ingredients in approximately the proportions indicated by weight:

| | Parts |
|---|---|
| White lead | 36.16 |
| Boiled linseed oil | 13.56 |
| Turpentine | 13.56 |
| Japan dryer | 9.04 |
| Molasses | 4.52 |
| Water | 4.52 |
| Vinegar | 4.52 |
| Flour | 4.52 |
| Pumice stone | 4.52 |
| Glue | 4.52 |
| Alum | 1.12 |

5. A filler and primer formed by boiling together a mixture comprising white lead, linseed oil, glue, molasses, a weak acid and a starchy constituent.

6. A filler and primer formed by thoroughly mixing and boiling together a mixture comprising a vegetable drying oil and pigment base, glue, molasses, alum, a weak acid and a drier.

In testimony whereof, I have hereunto signed my name to this specification.

GUSTAVE A. HORTON.